US011932738B2

(12) United States Patent
Yamaguchi

(10) Patent No.: US 11,932,738 B2
(45) Date of Patent: Mar. 19, 2024

(54) RUBBER-REINFORCING CORD AND RUBBER PRODUCT USING SAME

(71) Applicant: Nippon Sheet Glass Company, Limited, Tokyo (JP)

(72) Inventor: Tatsuya Yamaguchi, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/605,405

(22) PCT Filed: Apr. 11, 2018

(86) PCT No.: PCT/JP2018/015291
§ 371 (c)(1),
(2) Date: Oct. 15, 2019

(87) PCT Pub. No.: WO2018/198778
PCT Pub. Date: Nov. 1, 2018

(65) Prior Publication Data
US 2020/0123333 A1    Apr. 23, 2020

(30) Foreign Application Priority Data

Apr. 27, 2017 (JP) ................................. 2017-088358

(51) Int. Cl.
```
C08J 5/08      (2006.01)
C08L 15/00     (2006.01)
D06M 15/693    (2006.01)
D07B 1/16      (2006.01)
F16G 1/08      (2006.01)
F16G 1/28      (2006.01)
```

(52) U.S. Cl.
CPC .............. *C08J 5/08* (2013.01); *C08L 15/005* (2013.01); *D06M 15/693* (2013.01); *D07B 1/162* (2013.01); *F16G 1/08* (2013.01); *C08J 2315/00* (2013.01); *C08J 2415/00* (2013.01); *C08L 2205/025* (2013.01); *C08L 2205/03* (2013.01); *C08L 2205/16* (2013.01); *D07B 2201/104* (2013.01); *D07B 2201/2024* (2013.01); *D07B 2201/2041* (2013.01); *D07B 2201/2087* (2013.01); *D07B 2205/3003* (2013.01); *D07B 2501/2076* (2013.01); *F16G 1/28* (2013.01)

(58) Field of Classification Search
CPC ...... C08J 5/08; C08J 2315/00; C08J 2415/00; C08L 15/005; C08L 2205/025; C08L 2205/03; C08L 2205/16; D06M 15/963; D06M 2200/50; D06M 13/418; D06M 13/402; D07B 1/162; D07B 2201/104; D07B 2201/2024; D07B 2201/2041; D07B 2201/2087; D07B 2205/3003; D07B 2501/2076; D07B 1/06; F16G 1/28; B29D 29/08; C03C 25/27; D02G 3/44
See application file for complete search history.

(56) References Cited

U.S. PATENT DOCUMENTS

| | | |
|---|---|---|
| 2007/0205393 A1 | 9/2007 | Durairaj et al. |
| 2007/0219306 A1 | 9/2007 | Durairaj et al. |
| 2008/0032130 A1 | 2/2008 | Akiyama et al. |
| 2013/0281604 A1 | 10/2013 | Senda et al. |
| 2017/0016176 A1 | 1/2017 | Shimada et al. |
| 2018/0355129 A1 | 12/2018 | Katagiri |

FOREIGN PATENT DOCUMENTS

| | | |
|---|---|---|
| EP | 3088601 | 11/2016 |
| JP | 2009528422 | 8/2009 |
| JP | 2014025188 | 2/2014 |
| WO | 2006001385 | 1/2006 |
| WO | 2008041615 | 4/2008 |
| WO | 2012098910 | 7/2012 |
| WO | 2015092874 | 6/2015 |
| WO | 2017010098 | 1/2017 |

OTHER PUBLICATIONS

International Search Report and Written Opinion issued for International Patent Application No. PCT/JP2018/015291, dated Jul. 17, 2018, 8 pages including English translation of Search Report.
Extended European Search Report issued for European Patent Application No. 18791971.7, dated Dec. 21, 2020, 8 pages.

*Primary Examiner* — Jessica M Roswell
(74) *Attorney, Agent, or Firm* — Hamre, Schumann, Mueller & Larson, P.C.

(57) ABSTRACT

A rubber-reinforcing cord of the present invention is a rubber-reinforcing cord for reinforcing a rubber product. The rubber-reinforcing cord includes at least one strand. The strand includes at least one filament bundle and a coating provided to cover at least a portion of a surface of the filament bundle. The coating includes a rubber component and a crosslinking agent. The crosslinking agent includes two or more isocyanate compounds.

10 Claims, 1 Drawing Sheet

RUBBER-REINFORCING CORD AND RUBBER PRODUCT USING SAME

TECHNICAL FIELD

The present invention relates to a rubber-reinforcing cord and a rubber product including the rubber-reinforcing cord.

BACKGROUND ART

A rubber belt or metal chain is used for driving a cam shaft of an internal combustion engine for an automobile, driving an accessory such as an injection pump, and transmitting power in an industrial machine. There has been an increasing interest in energy saving recently, and attention is focused on the use of rubber belts which have high power transmission efficiency, for example, in view of improvement of fuel efficiency and the like. Having higher strength and higher elastic modulus than metal chains, rubber belts also have an advantage of capable of being used even under a high load condition. However, the strength of rubber belts may be decreased by repeated application of stress, and thus rubber belts are limited in use.

A rubber product such as a rubber belt commonly includes matrix rubber and rubber-reinforcing cord embedded in the matrix rubber. The strength of the rubber belt depends on the strength of the rubber-reinforcing cord. The rubber-reinforcing cord is, therefore, an important member that determines the durable life of the rubber belt.

The rubber-reinforcing cord is commonly formed of reinforcing fibers (a filament bundle including a plurality of filaments) and a coating protecting the surface of the reinforcing fibers. Such a coating can improve the adhesion between the rubber-reinforcing cord and matrix rubber when the rubber-reinforcing cord is embedded in the matrix rubber of a rubber product.

To form the above coating, for example, a liquid mixture (RFL liquid) of a resorcinol-formaldehyde condensate and rubber latex is used. Besides the RFL liquid, a liquid mixture, as disclosed in, for example, Patent Literature 1, containing rubber and a crosslinking agent (at least one selected from diisocyanate compounds, aromatic nitroso compounds, and maleimide crosslinking agents) can be used. As to the rubber-reinforcing cord, a configuration in which a plurality of coatings are provided to sufficiently protect the surface of the reinforcing fibers and achieve high adhesion to the matrix rubber is also known, as disclosed in Patent Literature 2.

CITATION LIST

Patent Literature

Patent Literature 1: WO 2006/001385 A1
Patent Literature 2: WO 2017/010098 A1

SUMMARY OF INVENTION

Technical Problem

However, a rubber product reinforced by the rubber-reinforcing cord is, for example, decreased in strength and ultimately broken by repeated application of stress, and has much room for improvement in strength. Such a break or the like of the rubber product is caused by separation between the rubber-reinforcing cord and matrix rubber, fatigue, such as an internal crack, of the rubber-reinforcing cord itself, or the like. For example, a rubber belt has a tight side and slack side during travel. That is, the rubber belt is subjected to repeated tensile stress during travel. Along with the rubber belt, the rubber-reinforcing cord in the rubber belt is also subjected to such repeated tensile stress. This fatigues the reinforcing cord. When the unity of the reinforcing fibers composing the reinforcing cord is low, that is, when the adhesion between the filaments included in the reinforcing fibers is insufficient, the entire cord cannot evenly bear the tensile stress, and thus the likelihood of fatigue of the cord is increased. Additionally, the low unity of the reinforcing fibers tends to allow water or oil to enter between the filaments and promote swelling of the coating, making fatigue of the rubber-reinforcing cord more likely to occur.

It is therefore an object of the present invention to provide a rubber-reinforcing cord maintaining the adhesion between filaments in reinforcing fibers and the adhesion between the rubber-reinforcing cord and matrix rubber even under repeated stress and consequently capable of reducing the likelihood of a decrease in the strength of a rubber product including the rubber-reinforcing cord and a break of the rubber product. Another object of the present invention is to provide a rubber product reinforced by such a rubber-reinforcing cord and thus having improved strength under repeated stress.

Solution to Problem

As a result of intensive studies, the present inventor has found that a crosslinking agent included in a coating covering reinforcing fibers greatly contributes to solve the above problems of the present invention, namely, the adhesion between filaments in the reinforcing fibers of a rubber-reinforcing cord and the adhesion between the rubber-reinforcing cord and matrix rubber. Based on this finding, the present inventor has made the following rubber-reinforcing cord of the present invention.

The present invention is a rubber-reinforcing cord for reinforcing a rubber product, the rubber-reinforcing cord including: at least one strand, wherein
  the strand includes at least one filament bundle and a coating provided to cover at least a portion of a surface of the filament bundle,
  the coating includes a rubber component and a crosslinking agent, and
  the crosslinking agent includes two or more isocyanate compounds.

The present invention also provides a rubber product reinforced by the above rubber-reinforcing cord of the present invention.

Advantageous Effects of Invention

When embedded in the matrix rubber of a rubber product, the rubber-reinforcing cord of the present invention maintains the adhesion between the filaments in the reinforcing fibers and the adhesion between the rubber-reinforcing cord and matrix rubber even under repeated stress and is consequently capable of reducing the likelihood of a decrease in the strength of the rubber product and a break of the rubber product. The rubber product of the present invention is reinforced by such a rubber-reinforcing cord, and thus can have improved strength under repeated application of stress.

DESCRIPTION OF EMBODIMENTS

Figure 1:
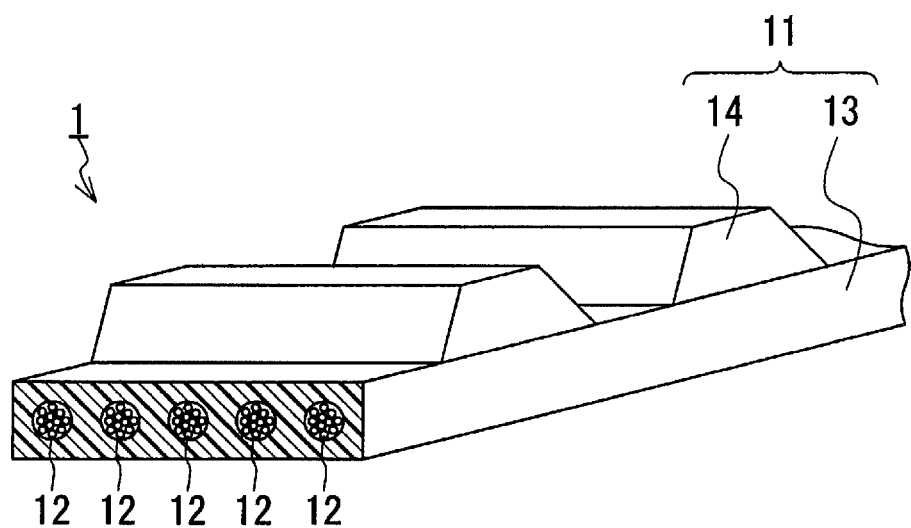
FIG. 1 is a cross-sectional view schematically showing an example of a rubber-reinforcing cord of the present invention.

Hereinafter, embodiments of the present invention will be described in detail.

[Rubber-Reinforcing Cord]

A rubber-reinforcing cord of the present embodiment is a cord for reinforcing a rubber product. The rubber-reinforcing cord includes at least one strand. The strand includes at least one filament bundle (reinforcing fibers) and a coating provided to cover at least a portion of a surface of the filament bundle. The coating includes a rubber component and a crosslinking agent. The crosslinking agent includes two or more isocyanate compounds.

Hereinafter, a method for producing the reinforcing cord of the present embodiment will be described in detail.

In the rubber-reinforcing cord of the present embodiment, the filament bundle composing the strand includes a plurality of filaments. The material of the filaments is not particularly limited. As the filaments of the rubber-reinforcing cord of the present embodiment, for example, glass fiber filaments, polyvinyl alcohol fiber filaments typified by vinylon fibers, polyester fiber filaments, polyamide fiber filaments such as nylon and aramid (aromatic polyamide) fibers, carbon fiber filaments, and poly(p-phenylene benzobisoxazole) (PBO) fiber filaments can be used. Among these, filaments of fibers having excellent dimensional stability, tensile strength, modulus, and bending fatigue resistance are preferably used. It is preferable to use at least one type of fiber filaments selected from, for example, glass fiber filaments, aramid fiber filaments, poly(p-phenylene benzobisoxazole) fiber filaments, and carbon fiber filaments. In particular, glass fiber filaments are preferred. The filament bundle may be composed of one type of the filaments, or may be composed of two or more types of the filaments.

The number of filaments included in the filament bundle is not particularly limited. The filament bundle can include, for example, 200 to 24000 filaments.

The surface of the filaments included in the filament bundle may be subjected to a pretreatment for increasing the bond strength. A preferred example of a pretreatment agent is a compound containing at least one functional group selected from the group consisting of an epoxy group and amino group. Examples of the pretreatment agent include aminosilanes, epoxysilanes, novolac epoxy resins, bisphenol A epoxy resins, bisphenol F epoxy resins, brominated epoxy resins, bisphenol AD epoxy resins, and glycidyl amine epoxy resins. Specific examples include Denacol series available from Nagase ChemteX Corporation, EPICLON series available from DIC Corporation, and Epikote series available from Mitsubishi Chemical Corporation. Polyurethane resins and isocyanate compounds can also be used as the pretreatment agent. For example, a treatment agent including at least one selected from the group consisting of epoxy resins, urethane resins, and isocyanate compounds may be used as the pretreatment agent. By the pretreatment performed using such a treatment agent, a resin layer including at least one selected from the group consisting of epoxy resins, urethane resins, and isocyanate compounds is further provided between the filament bundle and coating. The pretreatment of the surface can enhance the adhesion between the matrix rubber and rubber-reinforcing cord also when less-adhesive fiber filaments, such as, polyparaphenylene terephthalamide fiber filaments are used.

The number of filament bundles included in the rubber-reinforcing cord is not particularly limited, and may be one or may be two or more. The filament bundle may include a plurality of filament bundles assembled together. In this case, the plurality of filament bundles may be twisted or untwisted, respectively. The plurality of filament bundles in one bundle may be twisted together or may be untwisted.

The coating is provided to cover at least a portion of the surface of the filament bundle. The coating may be provided directly on the surface of the filament bundle, or may cover the surface of the filament bundle with another layer (e.g., the coating (e.g., the above resin layer) formed by the above pretreatment of the filaments) interposed therebetween.

The coating is formed by providing the later-described water-based treatment agent for coating formation on at least a portion of the surface of the filament bundle and drying the provided water-based treatment agent for coating formation by heat treatment. The water-based treatment agent can be provided on the surface of the filament bundle, for example, by impregnating the filament bundle with the water-based treatment agent for coating formation, or by applying the water-based treatment agent for coating formation to at least a portion of the surface of the filament bundle. This heat treatment almost completely removes water included in the filaments themselves and a solvent (e.g., water) of the water-based treatment agent.

The coating includes a rubber component. Examples of the rubber component include a butadiene-styrene copolymer, dicarboxylated butadiene-styrene polymer, vinylpyridine-butadiene-styrene terpolymer, chloroprene, butadiene rubber, chlorosulfonated polyethylene, an acrylonitrile-butadiene copolymer, nitrile rubber (NBR), hydrogenated nitrile rubber (HNBR), carboxyl-modified nitrile rubber (X-NBR), and carboxyl-modified hydrogenated nitrile rubber (X-HNBR). Among these, hydrogenated nitrile rubber (HNBR) and carboxyl-modified hydrogenated nitrile rubber (X-HNBR) are preferred because of their advantages of having high oil resistance and high water resistance.

The coating further includes a crosslinking agent. The crosslinking agent includes two or more isocyanate compounds. Because of the inclusion of two or more isocyanate compounds as the crosslinking agent, an adhesion reaction in the coating, namely, a reaction in the coating with which the filaments are adhered to each other, proceeds in multiple steps. As a result, the adhesion between the filaments owing to the coating is improved. Such improvement of the adhesion between the filaments improves the unity of the filament bundle, and thus fatigue of the strand composing the rubber-reinforcing cord can be prevented. Moreover, such improvement of the adhesion between the filaments reduces a gap between the filaments and a gap between the filament bundles and makes it difficult for impurities to enter into the gaps between the filaments and between the filament bundles. This can prevent a decrease in the tensile strength of the rubber-reinforcing cord itself. Furthermore, when the rubber-reinforcing cord of the present embodiment is embedded in matrix rubber, the coating improves the adhesion between the rubber-reinforcing cord and matrix rubber.

Therefore, when embedded in matrix rubber of a rubber product, the rubber-reinforcing cord of the present embodiment has improved adhesion between the filaments, improved adhesion between the filament bundles, and improved adhesion to matrix rubber even under repeated stress and is capable of reducing the likelihood of a decrease in the strength of the rubber product and a break of the rubber product, because of the inclusion of the coating including the two or more isocyanate compounds as the crosslinking agent.

Examples of the isocyanate compound include aromatic or aliphatic organic diisocyanates, polyisocyanates, blocked isocyanates, and blocked polyisocyanates. The two or more isocyanate compounds in the coating preferably include at least one selected from the group consisting of a blocked isocyanate and a diisocyanate. It is preferable to use two blocked isocyanates having different dissociation temperatures. That is, in other words, the two or more isocyanate compounds in the coating preferably include a first blocked isocyanate and a second blocked isocyanate having a different dissociation temperature from the first blocked isocyanate. A difference in dissociation temperature between the first blocked isocyanate and second blocked isocyanate is preferably 10° C. or more, more preferably 20° C. or more, and even more preferably 30° C. or more.

The coating may further include a crosslinking agent other than the isocyanate compound. Examples of the crosslinking agent other than the isocyanate compound include: quinone dioxime crosslinking agents such as p-quinone dioxime; methacrylate crosslinking agents such as lauryl methacrylate and methyl methacrylate; allyl crosslinking agents such as DAF (diallyl fumarate), DAP (diallyl phthalate), TAC (triallyl cyanurate), and TAIC (triallyl isocyanurate); maleimide crosslinking agents such as bismaleimide, phenylmaleimide, and N,N'-m-phenylene dimaleimide; aromatic nitroso compounds; sulfur; and peroxides. Among these, maleimide crosslinking agents are preferred. That is, a combined use of the two or more isocyanate compounds and a maleimide crosslinking agent is preferred for the coating. In some cases, by the combined use of the two or more isocyanate compounds and maleimide crosslinking agent, the maleimide crosslinking agent also functions as a crosslinking aid for the isocyanate compounds to further enhance the reactivity.

The coating may further include a filler. Examples of the filler include: fine particles of covalent compounds such as carbon black and silica; fine particles of sparingly-soluble salts; fine particles of metal oxides; fine particles of metal hydroxides; and fine particles of complex metal oxide salts such as talc. The filler exerts the effect of improving the characteristics such as tensile strength and tear strength of the coating by being dispersed in the rubber. Besides these effects, the filler has the effect of enhancing the cohesive force of an adhesive component and hence the adhesive strength between the fibers and coating and between the coating and matrix rubber.

The coating preferably is free of a resorcinol-formaldehyde condensate. When the coating is free of a resorcinol-formaldehyde condensate, the formation of the coating has no need to use a substance such as formaldehyde or ammonia which may impose a heavy load on the environment, and thus requires no environmental measures to be taken for workers. The coating may include a resorcinol-formaldehyde condensate.

In addition to the rubber component and crosslinking agent, the coating may further include the filler and another component (e.g., a metal oxide other than the metal oxide added as the above filler, and resin).

The contents of the rubber component and crosslinking agent in the coating are not particularly limited. The content of the rubber component in the coating can be, for example, 50 to 97 mass %. The content of the crosslinking agent in the coating can be, for example, 3 to 50 mass %. The total content of the rubber component and crosslinking agent in the coating is preferably 53 mass % or more. The coating may consist essentially of the rubber component and crosslinking agent. "Consisting essentially of the rubber component and crosslinking agent" means that the total content of the rubber component and crosslinking agent in the coating is 99 mass % or more. The coating may consist of the rubber component and crosslinking agent only.

The mass of the coating provided at least on the surface of the filament bundle is not particularly limited and may be adjusted as appropriate. The coating is preferably provided so that the mass of the coating will be 1 to 35% with respect to the mass of the filament bundle. The mass of the coating may be 10 to 25% with respect to the mass of the filament bundle or may be 12 to 20 mass % with respect to the mass of the filament bundle. Too large a mass of the coating may result in defects such as a reduction in the dimensional stability of the rubber-reinforcing cord in a rubber product and a reduction in the elastic modulus of the rubber-reinforcing cord. Too small a mass of the coating, on the other hand, may make fraying of the strand more likely or cause a decline in the ability of the coating to protect the fibers, thus resulting in shortening of the durable life of a rubber product.

In order to improve the adhesion to matrix rubber, another coating (hereinafter described as "second coating") for improving the adhesion to a rubber product may be further formed on the surface of the rubber-reinforcing cord of the present embodiment. When the previously-described coating alone is not enough to obtain sufficient adhesion to matrix rubber of a rubber product, the second coating is preferably formed on the surface of the cord in which final twists are given, in order to enhance the adhesion to the matrix rubber. The component of the second coating is required to be able to improve the adhesion to the matrix rubber. For example, a halogen-containing polymer adhesive (e.g., Chemlok manufactured by LORD Corporation) and an adhesive including an H-NBR and a crosslinking agent (e.g., maleimide crosslinking agent) are preferably used.

The number of twists in the rubber-reinforcing cord of the present embodiment is not particularly limited. The number of twists given to one strand (the twists may hereinafter be referred to as "primary twists") may be, for example, 20 to 160 twists/m, 30 to 120 twists/m, or 40 to 100 twists/m. The number of twists given to the plurality of strands (the twists may hereinafter be referred to as "final twists") may also be, for example, 20 to 160 twists/m, 30 to 120 twists/m, or 40 to 100 twists/m. Lang lay may be employed in which the direction of the primary twists and the direction of the final twists are the same, or regular lay may be employed in which the direction of the primary twists and the direction of the final twists are opposite. The directions of the twists are not limited and may be the S direction or the Z direction.

[Method for Producing Rubber-Reinforcing Cord]

Hereinafter, an example of the method for producing the rubber-reinforcing cord of the present embodiment will be described. The features described for the rubber-reinforcing cord of the present embodiment can be applied to the following production method and may not be described repeatedly. The features described for the following production method can be applied to the rubber-reinforcing cord of the present embodiment. The example of the production method includes the following steps.

First, the plurality of filaments are assembled into the filament bundle, and the water-based treatment agent for coating formation to be used to form the coating is prepared. Next, the water-based treatment agent for coating formation is provided on at least a portion of the surface of the filament bundle. After that, a heat treatment is performed to remove the solvent in the water-based treatment agent for coating formation.

By the above steps, the coating is formed on at least a portion of the surface of the filament bundle. The method for providing the water-based treatment agent for coating formation on at least a portion of the surface of the filament bundle is not limited. For example, the water-based treatment agent for coating formation may be applied onto the surface of the filament bundle, or the filament bundle may be immersed in the water-based treatment agent for coating formation.

The conditions of the heat treatment for removing the solvent of the water-based treatment agent for coating formation are not particularly limited; however, it is necessary to avoid carrying out the drying under conditions where a reaction caused by the crosslinking agent in the coating can proceed to completion. It is therefore preferable to shorten the drying time (to 5 minutes or less, for example) when the drying is performed at a relatively high temperature (at 80° C. or above, for example). When, for example, the temperature of the atmosphere is 150° C. or below, the drying time may be 5 minutes or less. In an example, the drying may be performed in an atmosphere at 80° C. to 280° C. for 0.1 to 2 minutes.

The filament bundle on which the coating has been formed may be twisted in one direction. The direction of twisting may be the S direction or the Z direction. The number of filaments included in the filament bundle and the number of twists given to the filament bundle are as specified above and thus will not be repeatedly described. The rubber-reinforcing cord of the present embodiment can be produced in this manner. The plurality of filament bundles each having a coating may be formed, assembled together, and given final twists. The direction of the final twists may be the same as or different from the direction of the twists of each filament bundle (the direction of the primary twists). Alternatively, the plurality of filament bundles each having a coating and not twisted respectively may be formed, assembled together, and given twists.

The coating may be formed after the filament bundle is twisted. The type of the filaments, the number of filaments, and the number of twists of the filaments are as described above.

In a preferred example of the production method of the present embodiment, the rubber-reinforcing cord is formed by twisting a bundle of the filament bundles in one direction after application of the water-based treatment agent for coating formation to the filament bundles or impregnation of the filament bundles with the water-based treatment agent for coating formation.

It is recommended to form an additional coating on the coating by applying a treatment agent for forming the additional coating onto the coating and removing a solvent in the treatment agent. The type of the additional coating can be selected as appropriate depending on matrix rubber of a rubber product including the rubber-reinforcing cord, and is desirably selected particularly in view of improvement of the adhesion.

Next, the water-based treatment agent for coating formation will be described.

The water-based treatment agent for coating formation preferably includes latex of rubber composing the rubber component of the coating. For example, when the rubber component of the coating is at least one rubber selected from the group consisting of hydrogenated nitrile rubber and carboxyl-modified hydrogenated nitrile rubber, the water-based treatment agent for coating formation includes latex of at least one rubber selected from the group consisting of hydrogenated nitrile rubber and carboxyl-modified hydrogenated nitrile rubber. The water-based treatment agent for coating formation may include one type of rubber latex or may include two or more types of rubber latex, depending on the rubber component of the coating.

The water-based treatment agent for coating formation further includes a crosslinking agent. The crosslinking agent included in the water-based treatment agent for coating formation is the same as the one described above as the crosslinking agent included in the coating, and thus will not be repeatedly described. The crosslinking agent included in the water-based treatment agent for coating formation is preferably used in the form of an aqueous dispersion in order to allow the crosslinking agent to be uniformly present in the water-based treatment agent.

The water-based treatment agent for coating formation may further include a filler. Examples of the filler that may be included in the water-based treatment agent for coating formation are the same as the ones described above as the filler included in the coating, and thus will not be repeatedly described.

The water-based treatment agent for coating formation is preferably free of a resorcinol-formaldehyde condensate. The water-based treatment agent for coating formation may include a resorcinol-formaldehyde condensate.

In addition to the rubber latex and crosslinking agent, the water-based treatment agent for coating formation may include the filler and another component. For example, the water-based treatment agent for coating formation may include a resin, plasticizer, anti-aging agent, stabilizer, or metal oxide other than the metal oxide added as the above filler. The water-based treatment agent may be one that is free of resin.

[Rubber Product]

A rubber product of the present embodiment is a rubber product reinforced by the rubber-reinforcing cord of the present embodiment. The type of the rubber product is not particularly limited. Examples of the rubber product of the present embodiment include tires of automobiles and bicycles and transmission belts. Examples of the transmission belts include synchronous transmission belts and friction transmission belts. Examples of the synchronous transmission belts include toothed belts typified by timing belts for automobiles. Examples of the friction transmission belts include flat belts, round belts, V belts, and V-ribbed belts. That is, the rubber product of the present embodiment may be a toothed belt, flat belt, round belt, V belt, or V-ribbed belt.

The rubber product of the present embodiment is formed by embedding the rubber-reinforcing cord of the present embodiment in a rubber composition (matrix rubber). The technique for embedding the rubber-reinforcing cord in the matrix rubber is not particularly limited, and a commonly-known technique may be employed. The rubber-reinforcing cord of the present embodiment is embedded in the rubber product (e.g., a rubber belt) of the present embodiment. The rubber product of the present embodiment thus formed has high bending fatigue resistance. Therefore, the rubber product of the present embodiment is particularly suitable for use in, for example, a timing belt of a vehicle engine and a belt for driving an accessory of a vehicle.

The type of the rubber included in the rubber composition in which the rubber-reinforcing cord of the present embodiment is embedded is not particularly limited. The rubber may be, for example, chloroprene rubber, chlorosulfonated polyethylene rubber, ethylene propylene rubber, or hydrogenated nitrile rubber. The hydrogenated nitrile rubber may be one in which a zinc acrylate derivative (such as zinc methacrylate) is dispersed. At least one rubber selected from hydrogenated nitrile rubber as such and hydrogenated nitrile rubber in which a zinc acrylate derivative is dispersed is preferable in view of water resistance and oil resistance. The matrix rubber may further include carboxyl-modified hydrogenated nitrile rubber. In view of adhesion, it is preferable for the coating of the rubber-reinforcing cord and the rubber composition of the rubber product to contain or to be formed of the same type of rubber.

The compositions of the treatment agents used in Examples 2 and 3 are shown in Table 1. The mass of the coating of each cord is 19% with respect to the mass of the filament bundle.

Comparative Examples 1 to 3

Rubber-reinforcing cords of Comparative Examples 1 to 3 were produced under the same conditions as in Example 1, except that the composition of the treatment agent was changed. The compositions of the treatment agents used in Comparative Examples 1 to 3 are shown in Table 1. As shown in Table 1, the treatment agents each including only one isocyanate compound were used in Comparative Examples 1 to 3.

TABLE 1

|  |  | Example | | | Comparative Example | | |
|---|---|---|---|---|---|---|---|
|  |  | 1 | 2 | 3 | 1 | 2 | 3 |
|  |  | Solid mass ratio (parts by mass) | | | | | |
| Carboxy-modified hydrogenated nitrile rubber latex (*1) | | 100 | 100 | 100 | 100 | 100 | 100 |
| Crosslinking agent | 4,4'-Diphenylmethane bismaleimide | 20 | 20 | 20 | 20 | 20 | 20 |
|  | Blocked isocyanate A (*2) | 10 | 10 | — | 20 | — | — |
|  | Blocked isocyanate B (*3) | 10 | — | 10 | — | 20 | — |
|  | Blocked isocyanate C (*4) | — | 10 | 10 | — | — | 20 |

(*1) Zetpol Latex (manufactured by Zeon Corporation)
(*2) MEIKANATE DM-7000 having a dissociation temperature of 180° C. (Meisei Chemical Works, Ltd.)
(*3) ELASTRON BN-11 having a dissociation temperature of 150° C. (manufactured by DKS Co., Ltd.)
(*4) ELASTRON BN-69 having a dissociation temperature of 120° C. (manufactured by DKS Co., Ltd.)

FIG. 1 shows a toothed belt as one example of the rubber product. The toothed belt 1 shown in FIG. 1 includes a belt body 11 and plurality of rubber-reinforcing cords 12. The belt body 11 includes a belt portion 13 and plurality of tooth portions 14 arranged at regular intervals and protruding from the belt portion 13. The rubber-reinforcing cords 12 are embedded within the belt portion 13 so as to extend parallel to the length direction of the belt portion 13. Each rubber-reinforcing cord 12 is the rubber-reinforcing cord of the present embodiment.

EXAMPLES

Hereinafter, the embodiments of the present invention will be described in more detail by way of Examples and Comparative Examples.

[Production of Rubber-Reinforcing Cord]

Examples 1 to 3

A glass fiber composed of a bundle of 200 glass fiber filaments made of high-strength glass and having an average diameter of 7 μm was prepared. Thirty-three such glass fibers were aligned into a bundle of filaments. The filament bundle was immersed in a treatment agent whose solids composition has a mass ratio (solid mass ratio) shown in Table 1 below and then dried at 150° C. for 2 minutes to obtain one glass fiber cord. Twists were given to this glass fiber cord in one direction at 80 twists/m to produce a rubber-reinforcing cord of Example 1.

Rubber-reinforcing cords of Examples 2 and 3 were produced under the same conditions as in Example 1, except that the composition of the treatment agent was changed.

<Cyclic Tensile Test>

Each of the rubber-reinforcing cords of Examples 1 to 3 and Comparative Examples 1 to 3 was embedded in matrix rubber having the composition shown in Table 2 below to produce a test specimen (size: 200 mm×10 mm×3 mm).

TABLE 2

| Component | Mass ratio |
|---|---|
| Hydrogenated nitrile rubber (*1) | 70 |
| Hydrogenated nitrile rubber (*2) containing zinc dimethacrylate | 30 |
| Zinc oxide | 10 |
| Stearic acid | 1 |
| Carbon black | 30 |
| Trioctyl trimellitate | 5 |
| Sulfur | 0.1 |
| 1,3-bis(t-butylperoxy-isopropyl)benzene | 6 |
| Magnesium oxide | 1 |
| 4,4'-(α,α-dimethylbenzyl)diphenylamine | 0.5 |
| Zinc salt of 2-mercaptobenzimidazole | 0.5 |
| Triallyl isocyanurate | 1 |

(*1) Zetpol 2020 (manufactured by Zeon Corporation)
(*2) Zetpol 2000L (manufactured by Zeon Corporation)

Figure 2:
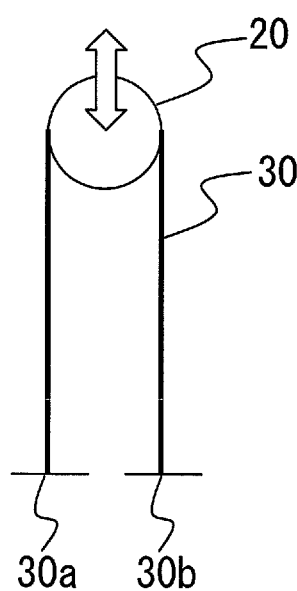
FIG. 2 schematically shows a cyclic tensile test performed in EXAMPLES.

Next, each specimen was subjected to a cyclic tensile test and measured for the number of cycles until the specimen was broken. For the cyclic tensile test, a dynamic fatigue resistance test system commonly used was employed. The cyclic tensile tester includes, as shown in FIG. 2, a flat pulley 20 having a diameter of 20 mm and a motor (not illustrated). First, a produced specimen 30 was hung on the pulley 20 and fixed at both ends 30a and 30b. In this state, the pulley was reciprocated in directions indicated by an arrow shown in FIG. 2, and the number of cycles was measured until the specimen was broken. As the pully 20 can detect a load, the reciprocation of the pully 20 was controlled by a load. The reciprocation was performed under loads of 10 to 300 N, 10 to 400 N, and 10 to 500 N. The results are shown in Table 3.

TABLE 3

| Maximum load/N | Example | | | Comparative Example | | |
|---|---|---|---|---|---|---|
| | 1 | 2 | 3 | 1 | 2 | 3 |
| | Number of break cycles | | | | | |
| 300 | 15,719,433 | 8,022,107 | 9,433,440 | 2,170,224 | 1,605,691 | 407,424 |
| 400 | 149,169 | 76,126 | 89,518 | 20,594 | 15,237 | 3,866 |
| 500 | 4,024 | 2,054 | 2,415 | 556 | 411 | 104 |

As shown in Table 3, the numbers of break cycles of the rubber-reinforcing cords of Examples 1 to 3 in which the crosslinking agent included in the coating includes two isocyanate compounds are greater than those of the rubber-reinforcing cords of Comparative Examples 1 to 3 in which the crosslinking agent included in the coating includes one isocyanate compound. This result confirms that a rubber product having improved strength under repeated stress can be obtained using the rubber-reinforcing cord including the coating including two or more isocyanate compounds as the crosslinking agent.

The invention claimed is:

1. A rubber-reinforcing cord for reinforcing a rubber product, the rubber-reinforcing cord comprising: at least one strand, wherein
the strand comprises at least one filament bundle and a coating provided to cover at least a portion of a surface of the filament bundle,
the coating comprises a rubber component and a crosslinking agent, and
the crosslinking agent comprises two or more isocyanate compounds,
wherein the two or more isocyanate compounds comprise at least one selected from the group consisting of a blocked isocyanate and a diisocyanate,
wherein the coating is free of a resorcinol-formaldehyde condensate,
wherein the two or more isocyanate compounds comprise a first blocked isocyanate and a second blocked isocyanate having a different dissociation temperature from the first blocked isocyanate, and
wherein a difference in the dissociation temperature of the first blocked isocyanate and the second blocked isocyanate is 10° C. or more.

2. The rubber-reinforcing cord according to claim 1, wherein the crosslinking agent further comprises a maleimide crosslinking agent.

3. A rubber product reinforced by the rubber-reinforcing cord according to claim 1.

4. The rubber product according to claim 3, being a rubber belt comprising matrix rubber and the rubber-reinforcing cord embedded in the matrix rubber.

5. The rubber-reinforcing cord according to claim 1, wherein the coating comprises a filler that includes at least one of fine particles of covalent compounds, fine particles of sparingly-soluble salts, fine particles of metal oxides, fine particles of metal hydroxides, and fine particles of complex metal oxide salts.

6. The rubber-reinforcing cord according to claim 1, wherein the coating consists essentially of the rubber component and the crosslinking agent, and optionally a filler that includes at least one of fine particles of covalent compounds, fine particles of sparingly-soluble salts, fine particles of metal oxides, fine particles of metal hydroxides, and fine particles of complex metal oxide salts.

7. The rubber-reinforcing cord according to claim 1, wherein the coating is provided only on the surface of the filament bundle.

8. The rubber-reinforcing cord according to claim 1, wherein only the coating comprising the rubber compound and the crosslinking agent is provided on the at least one filament bundle.

9. The rubber-reinforcing cord according to claim 1, wherein a mass of the coating is 10 to 25% with respect to a mass of the at least one filament bundle.

10. The rubber-reinforcing cord according to claim 1, wherein the rubber component comprises at least one rubber component selected from the group consisting of hydrogenated nitrile rubber, carboxyl-modified hydrogenated nitrile rubber, and carboxyl-modified nitrile rubber.

* * * * *